Sept. 25, 1934.　　　　J. S. KEAN　　　　1,974,424
LANDING GEAR
Filed Aug. 25, 1932　　　3 Sheets-Sheet 1
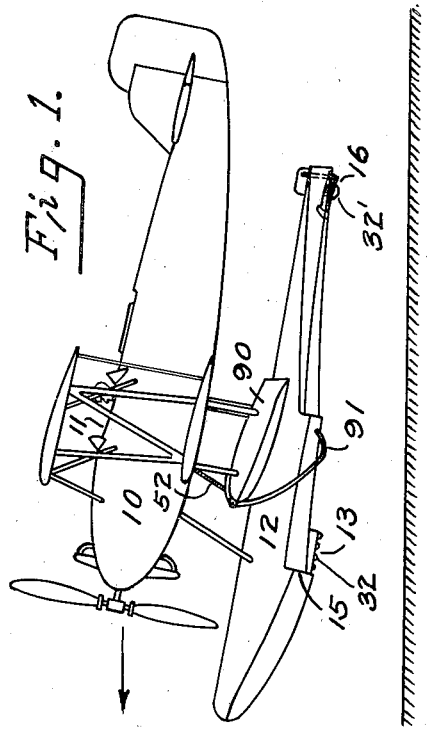
Fig. 1.
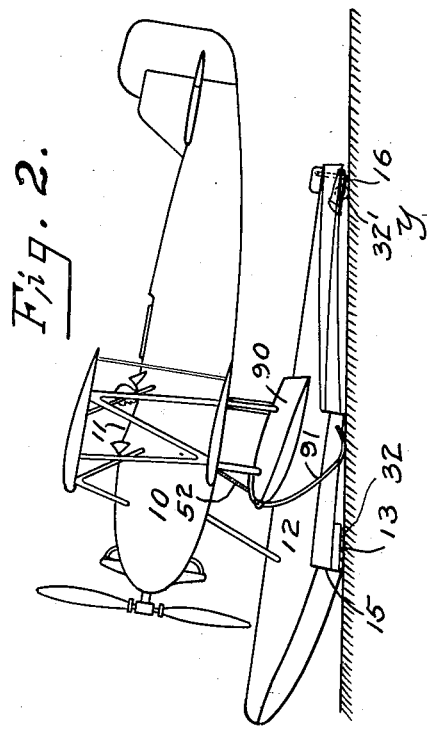
Fig. 2.
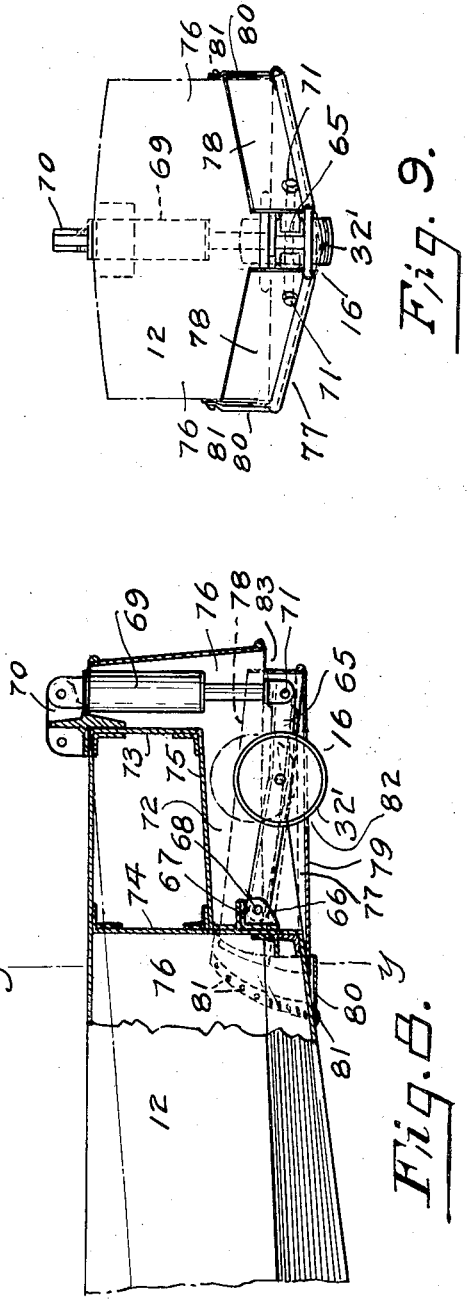
Fig. 9.
Fig. 8.
JOHN S. KEAN
INVENTOR
BY
Robert A. Lavender
ATTORNEY Sept. 25, 1934.  J. S. KEAN  1,974,424
LANDING GEAR
Filed Aug. 25, 1932   3 Sheets-Sheet 2
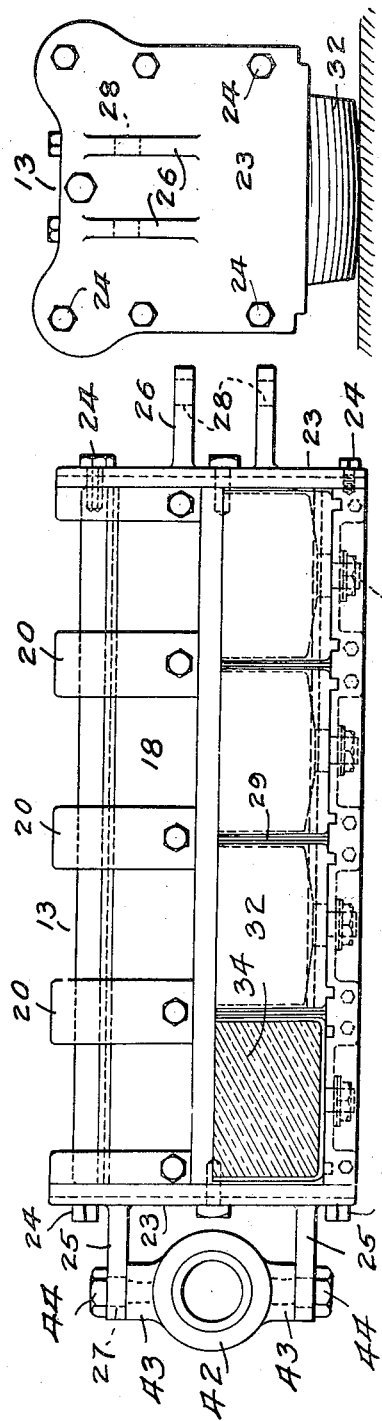
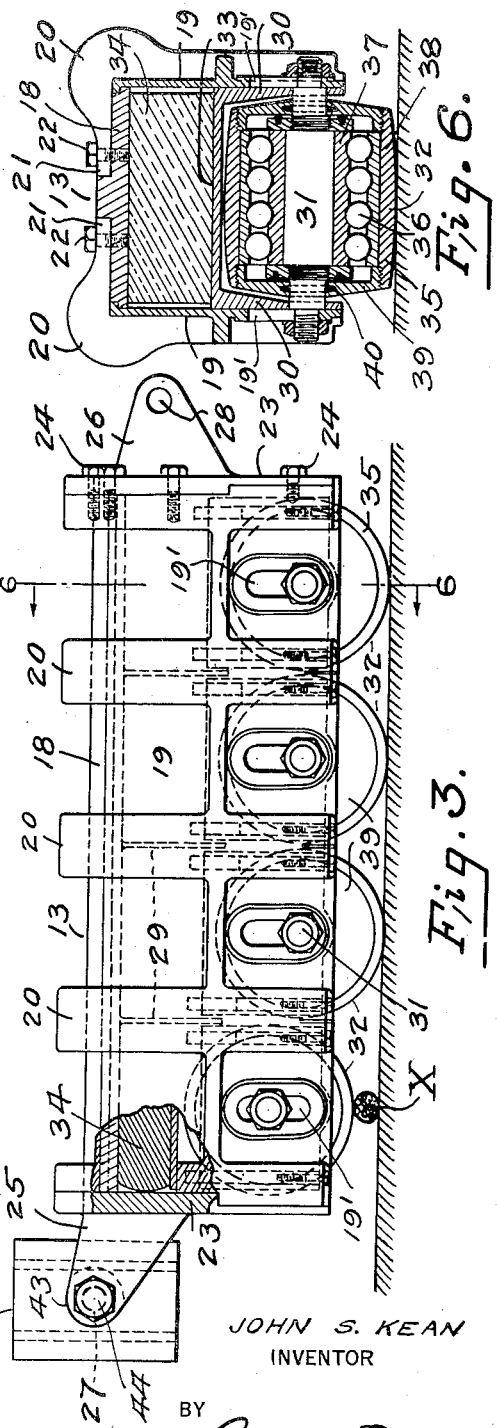
JOHN S. KEAN
INVENTOR
BY Robert A. Lavender
ATTORNEY

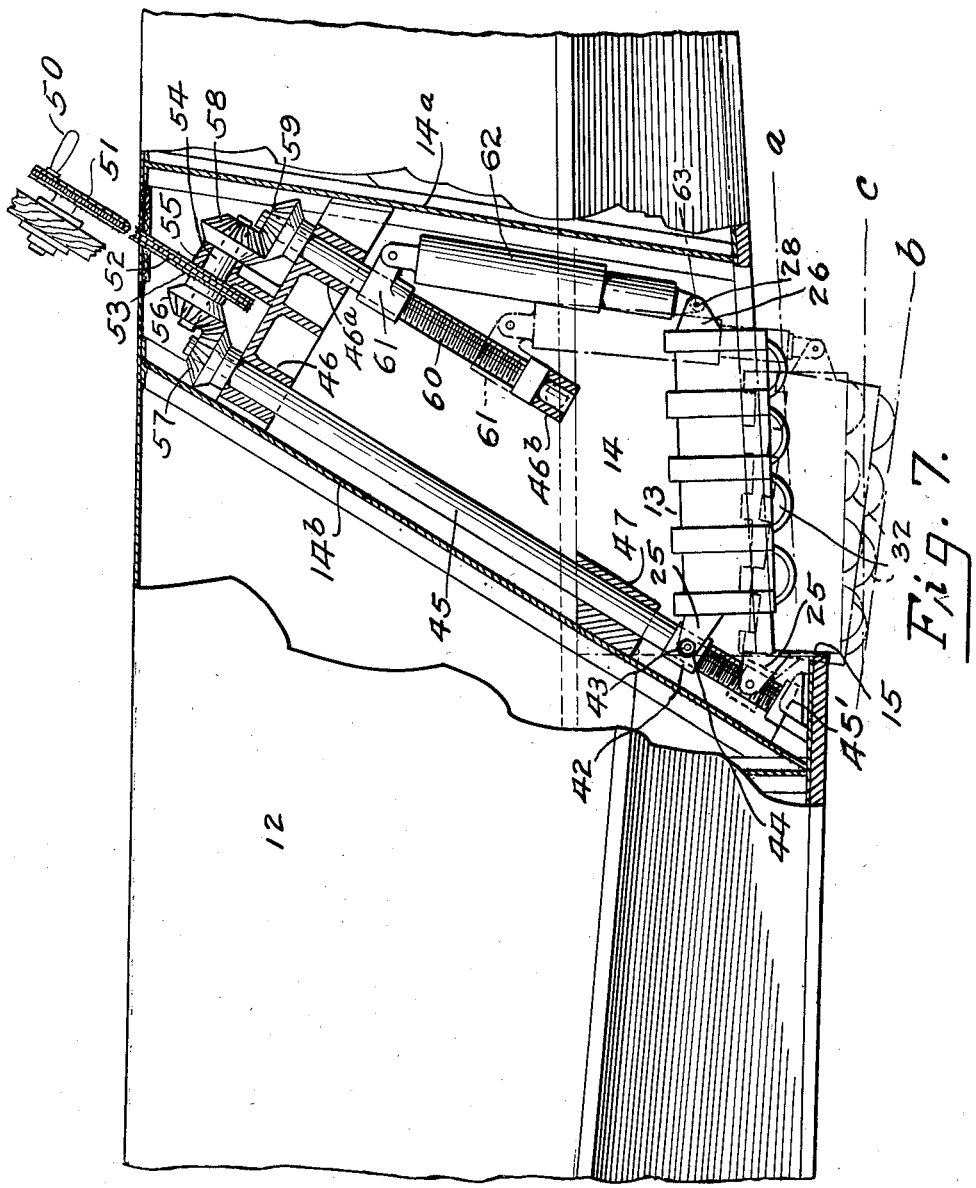

Patented Sept. 25, 1934

1,974,424

UNITED STATES PATENT OFFICE 1,974,424

LANDING GEAR

John S. Kean, Philadelphia, Pa.

Application August 25, 1932, Serial No. 630,447

14 Claims. (Cl. 244—2)

(Granted under the act of March 3, 1883, as amended April 30, 1928; 370 O. G. 757)

My invention relates broadly to a landing gear for aircraft, and more particularly to a gear especially suited for taking off from and landing upon the water or landing upon relatively small and smooth surfaced landing areas.

The primary object of my invention is to provide a landing gear for use in airplanes of the amphibian type which may be retracted within the pontoon float or hull so as not to interfere with the take-off from or operation of the airplane on water.

Another object of my invention is to provide a landing gear which will automatically decelerate the plane when landing upon a hard smooth surface of a landing area.

A further object of my invention is to provide a landing gear for amphibian aircraft that will permit of taxiing upon and/or take-off from a hard smooth landing surface or from the surface of the water.

A further object of my invention is to provide a retractable shock absorbing landing gear in which the main shock absorbing mechanism is substantially housed within the floats thereby eliminating the resistance commonly encountered.

A further object of my invention is to provide a retractable cage for supporting a series of landing rollers in such a manner as to prevent entrance of water into the ball bearings of rollers.

A further object of my invention is to provide a shock absorbing stern landing gear having a shoe raised simultaneously with the surface engaging contact member for retarding the entrance of turbulent waters within the housing space of the operating mechanism when taking off from the water.

It is also an object of my invention to provide a device that is rugged, light of weight, and one that will provide a minimum of resistance to the aerodynamic qualification, and one that will decelerate the landing speed of an amphibian airplane upon contact upon a hard smooth and restricted surface of a landing area.

With the above and other objects in view, my invention consists in the construction, combination and arrangement of parts as will be described more fully hereinafter.

Reference is to be had to the accompanying drawings forming a part of the specification, in which like reference characters indicate corresponding parts throughout the several views and in which:

Fig. 1 is a side elevation of an airplane having my improved landing gear features incorporated therein and showing the airplane in a stalling position and about to settle down upon a landing area;

Fig. 2 is a view showing the airplane after coming to rest upon the landing area;

Fig. 3 is a detail side elevation of the retractable landing carriage;

Fig. 4 is a plan view of the landing carriage shown partly in section to disclose the surface engaging rollers;

Fig. 5 is an end view of Figure 3;

Figure 6 is a vertical section on the line 6—6 of Figure 3;

Figure 7 is an enlarged detail of the mechanism for operating the main landing carriage located centrally of the pontoon or float;

Fig. 8 is a detail view of the landing mechanism located at the stern of the pontoon or float;

Fig. 9 is a rear view of the parts shown in Fig. 8, and extending forward to the section indicated by the line y—y.

Referring more particularly to the drawings, 10 indicates a conventional type of airplane shown more or less diagrammatically, having a pilot's cockpit 11 and being provided for the purpose of illustration with a single pontoon 12. The pontoon 12 is designed structurally to withstand contemplated landings upon the hard smooth surface or restricted areas of landing places such as the decks of ships, landing platforms and the like by the installation of my retractable landing gear.

The force of landing is taken up by my retractable rollers carriage 13 installed in a compartment 14 between the bulkheads 14a and 14b and made water-tight from the interior of the pontoon 12, and located preferably aft of the step 15. After the airplane has settled down upon the landing area the weight of the stern of the pontoon will be supported upon the roller carriage 16.

The carriage 13 is provided with a series of landing surface engaging rollers 32 mounted upon axles 31 having bearings in the side flanges 30 of the resiliently mounted guide frames 33 located in compartments bounded by the walls 19 and partitions 29. Each of the rollers 32 is cushioned by a resilient pad 34 inserted between the frames 33 and the plate 18 to absorb the jars encountered as the plane passes over an uneven contour or when passing over an obstruction (such as shown at X in Figure 3) upon a landing area. The side walls 19 are provided with elongated guide ways 19' to receive the ends of the axles 31.

Each roller consists of a cylinder 35 to house the ball bearings 36 and the inner and outer raceways 37 and 38. End caps 39 having packing glands 40 are threaded into the ends of the cylinders 35 in order to prevent admittance of water and dirt.

Provision is made for retracting and extending the roller carriage 13 from the fully retracted position "a" as shown in full lines in Figure 7 which indicates the stowed position while landings and take-offs are being made from the water; while the extended or shock absorbing position is shown by the broken line position "b". The intermediate position is indicated as "c" to represent the approximate position of the carriage 13 when the rollers are in contact with the landing surface and the plane is about to come to a stop.

The mechanism for actuating the carriage 13 has incorporated therein a shaft 45 mounted in the bearings 46 and 47 secured to the interior structure of the pontoon 12 and the thrust bearing 45' located at the lower end and secured also to the pontoon structure forming the step 15. A collar 42 mounted upon trunnions 43 and supported by the lugs 25 of the end plate 23 through the bolt 44 is internally threaded to engage the threads on the lower end of the shaft 45.

A manually operated crank 50 located within convenient reach of the pilot and inside of the fuselage 10, is attached to turn a sprocket wheel 51 which will transmit motion through a chain 52 to another sprocket wheel 53 secured to a stud shaft 54 mounted in a bearing 55 which in turn will rotate the meshed gears 56 and 58 secured to the upper end of the shaft 45 and to one end of the stud shaft 54. Thus by turning the crank 50, the shaft is rotated so as to cause the threaded collar 42 and the attached carriage 13 to be raised or lowered.

Provision is made for manipulating the rear end of the roller carriage 13 at a slightly greater speed than the forward end, and while I accomplish this movement by selecting for threaded element 60, threads of greater pitch than used for part 45, I wish it to be understood that the variance of speed could be done by the proper selection of the ratio of gearing as well or by other mechanical methods. I have shown the meshed gears 58 and 59 secured to the stud shaft 54 and to the threaded member 60 for moving the threaded bearing collar 61 forming the upper connection of a shock absorbing strut 62. The strut used may be of the Oleo type, or of the hydraulic or spring type. The lower end of the strut 62 is secured by a pin 63 inserted in the aperture 28 of the carriage 13. The upper end of the threaded member 60 is mounted in a bearing 46a and the lower end is supported in the bearing 46b.

The stern of the pontoon 12 is provided with a landing mechanism 16 having a single roller 32' of the type described. The roller 32' is mounted between the channel members 65 and pivotally attached at the forward end to a fitting 66 supported by a cross bar 67 of the frame structure by a pin 68. A shock absorbing strut 69 is located between a fitting 70 secured to pontoon 12, and to the rear end of the members 65 as at 71. The parts 32', 65, and 69 are housed within a compartment 72 at the stern of the pontoon 12 and made water-tight from the interior by partitions of bulkheads 73, 74 and 75 and bounded by the sides 76.

In order to restrict the entrance of turbulent waters into the compartment 72 I have provided a sheet metal shoe 77 which has side walls 78 and a V bottom 79. This shoe is attached to the channel members 65 at 71 at the rear end while the forward end is held in position by a sheet metal boot 80 which is secured to the sides 76 and bottom by rivets or the like 81 so that the rear ends slope slightly away to allow space for the shoe 77.

The roller 32' is projected through an opening 82 in the bottom 79 of the shoe 77 whose side walls are cut short at the rear as at 83 so that any water entering the compartment 72 will have free egress as soon as the plane gets underway.

While I have shown for the purpose of illustration a typical airplane having a single pontoon which would necessitate the use of the wing tip floats 90 and skids 91 as is customary, I also contemplate the use of twin pontoons equipped with my improved retractable landing gear features which would naturally eliminate the necessity for the wing tip floats and/or skids.

It is to be further noted that while the float bottom has been illustrated as having the so-called step construction, it is to be understood that floats or pontoons with the step or steps omitted will function successfully in combination with my improved landing gear features likewise incorporated therein.

It will be understood that the above description and accompanying drawings comprehend only the general and preferred embodiment of my invention, and that various changes in construction, proportion and arrangement of parts may be within the scope of the appended claims, without sacrificing any of the advantages of my invention.

The herein described invention may be manufactured and used by or for the Government of the United States for governmental purposes without the payment of any royalties thereon.

What I claim is:

1. In an amphibian gear for aircraft, in combination, a pontoon having a step transversely located on its bottom, a compartment in juxtaposition to the step, a shock absorbing landing carriage adapted to be housed within said compartment, a series of independent rollers mounted in said carriage and means for retracting or extending one end of said carriage a greater amount than the other end of said carriage whereby the rear wheels of the series will be extended or retracted a greater amount than the forward wheels.

2. In a shock absorbing stern landing carriage for amphibian aircraft, a pontoon, a compartment for housing the carriage made substantially water-tight from the interior of the said pontoon, a rigid frame supported at one end by a pivoted connection to the structure of said pontoon, a shock absorber strut attached to the other end of said frame, and to a bracket on said pontoon, a roller supported in said frame intermediate its ends for contact with a landing surface, and means connected to and movable with said frame for preventing water from entering said compartment during a take-off from the water.

3. In an amphibian gear for aircraft, a pontoon having a step transversely of the bottom thereof, a compartment located aft of the step of said pontoon and water-tight to the interior thereof, a landing carriage within said compartment, a multiplicity of independent surface engaging rollers having bearings in said carriage, independent shock-absorbing means within and forming a part of said carriage for damping the minor landing force of each of said rollers independently, shock absorbing means between said carriage and said pontoon for damping the major landing forces of all of said rollers collectively, and means for moving one end of said carriage a greater distance than the other end whereby the rear rollers in the carriage will be extended or retracted a greater distance than the forward roller.

4. In a shock absorbing stern landing carriage for amphibian aircraft, a pontoon, a compartment within said pontoon for housing the carriage made substantially water-tight from the interior of the said pontoon, a rigid frame supported at one end by a pivotal connection to said pontoon, a shock absorber strut attached to the other end of said frame, and to a bracket on said pontoon, a roller supported in said frame intermediate its ends for contact with a landing surface, a shoe conforming to the contour of the side and bottom of the stern for deflecting the flow of water from within said compartment when moving upon the surface of the water a boot, said shoe being shielded at its forward end by the boot and being provided with a connection at the rear for simultaneous movement with said frame.

5. In a landing unit for aircraft, in combination, a pontoon having a transverse step approximately mid-way of its length and dividing the bottom thereof into a planing surface forward of the step and an offset portion inclined rearwardly of the step to the stern, a forward compartment having an open bottom and located immediately aft of the step, a rear compartment immediately forward of the stern of said pontoon, a forward landing carriage adapted to be retracted into said forward compartment thereby substantially closing the open bottom of said compartment, a series of independent cylindrical surface contacting landing units having bearings in said forward landing carriage, another landing unit pivotally mounted within said rear compartment, means adapted to move one end of said forward carriage a greater amount than the other end of said forward carriage so as to retract or extend the rear contacting units a greater distance than the forward units, and means for deflecting turbulent waters from said rear compartment.

6. In a landing unit for aircraft, in combination, a pontoon having a transversely located step approximately mid-way of its length and dividing the bottom thereof into an unobstructed planing surface forward of the step and an offset portion inclined rearwardly of the step to the stern, a forward compartment located immediately aft of the step having an open bottom, a rear compartment immediately forward of the stern of said pontoon, a forward landing carriage adapted to be retracted into said forward compartment and thereby substantially close the open bottom thereof, a series of independent cylindrical surface contacting landing units having bearings in said forward landing carriage, another landing unit pivotally mounted within said rear compartment, means for moving the forward end of said forward carriage to clear the depth of the step and for moving the rear end of said forward carriage a greater distance to a position parallel to the inclined offset portion located aft of the step of said pontoon, and means for deflecting turbulent water from said rear compartment.

7. In a landing unit for aircraft, in combination, a pontoon having a transversely located step dividing the bottom thereof into an unobstructed planing surface forward of the step and an offset portion inclined toward the stern, a compartment immediately aft of the step having an open bottom, a landing carriage adapted to be moved within said compartment and substantially close the open bottom of said compartment, a series of independent cylindrical surface contacting landing units having bearings in said landing carriage, and means for moving the forward end of said carriage a distance equal to the depth of the step and simultaneously move the aft end of said carriage a greater distance to a position parallel to the inclined offset portion aft of the step.

8. In a landing unit for aircraft, in combination, a pontoon having a transversely located step dividing the bottom thereof into an unobstructed planing surface forward of the step and an offset portion inclined toward the stern, a compartment aft of the step having an open bottom, a landing carriage adapted to be retracted to substantially close the open bottom of said compartment, a series of small individual cylindrical surface engaging contacting units having bearings in said landing carriage, resilient members secured to and mounted in said carriage for allowing the individual contacting units to conform to the contour of a landing surface, and means for simultaneously moving the rear end of said carriage a greater distance than the forward end of said carriage when housing said carriage within said compartment or extending the carriage.

9. In a landing unit for aircraft, in combination, a pontoon having a transversely located step dividing the bottom thereof into an unobstructed planing surface forward of the step and an offset portion extending rearwardly of the step, a compartment aft of the step having an open bottom, a landing carriage adapted to be retracted to substantially close the open bottom of said compartment thereby preventing the entrance of turbulent water during a take-off from a body of water, a series of individual surface engaging contact units having bearings in said landing carriage, means between said carriage and said bearings allowing each of the contact units to conform to the contour of the landing surface, and means for simultaneously moving the aft end of said carriage a greater amount than the forward end of said carriage while retracting and extending the same from within said compartment.

10. In an amphibian gear for aircraft, in combination, a pontoon having a step transversely of its bottom, a compartment in juxtaposition to the step, a landing carriage adapted to be housed within said compartment, a series of independent rollers mounted in said carriage, shock absorbing means within said carriage for said independent rollers, a shock absorbing strut connected to said carriage, and means for retracting or extending said strut and carriage.

11. In an amphibian gear for aircraft, in combination, a pontoon having a transverse step, a compartment in said pontoon, a landing carriage having a series of independent rollers, and means adapted to retract said carriage into the compartment or to lower the carriage so that the forward end of the carriage abuts said steps and the rear rollers of the series are lower than the rollers adjacent the steps.

12. In an amphibian gear for aircraft, in combination, a pontoon having a transverse step across its bottom, a compartment in juxtaposition to said step, a landing carriage adapted to be housed in said compartment, a plurality of independent wheels rotatively mounted in and to the carriage, shock absorbing means within said carriage for each of said independent wheels, shock absorbing means for the carriage, means for retracting and extending said carriage, and means for locking the carriage in the extended, retracted or any intermediate position.

13. In an amphibian gear for aircraft, in combination, a pontoon having a transverse step across its bottom, a compartment in juxtaposition to the step, a landing carriage having a plurality of independent wheels, adapted to be housed in said compartment, and means for retracting and extending the carriage, said means comprising two shafts having threads of different pitch, collars movably mounted on said shafts, one end of said carriage secured to one of said collars, and a shock absorbing strut securing the opposite end of the carriage to the second collar and manually operated means for rotating said shafts whereby the carriage can be retracted into the compartment or lowered in landing position, with the forward end of the carriage abutting the steps and the rear wheels in a lower position than the wheels adjacent the step.

14. In an amphibian gear for aircraft, in combination, a pontoon having a transverse step across its bottom, a compartment in juxtaposition to the step, a landing carriage adapted to be housed within said compartment, shock absorbing means for said carriage, a series of independent wheels rotatively mounted in the carriage, shock absorbing means within the carriage for each of said independent wheels, means for retracting and extending the carriage, and a stern landing arrangement comprising a stern compartment, a shock absorbing landing carriage mounted therein, and means movable by and with said stern carriage for deflecting water from the stern compartment.

JOHN S. KEAN.